US010701751B2

(12) United States Patent
Henttonen et al.

(10) Patent No.: US 10,701,751 B2
(45) Date of Patent: Jun. 30, 2020

(54) SIGNALING FOR MULTIPLE RADIO ACCESS TECHNOLOGY DUAL CONNECTIVITY IN WIRELESS NETWORK

(71) Applicant: NOKIA TECHNOLOGIES OY, Espoo (FI)

(72) Inventors: Tero Henttonen, Espoo (FI); Antti Toskala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/134,765

(22) Filed: Sep. 18, 2018

(65) Prior Publication Data
US 2019/0200406 A1 Jun. 27, 2019

Related U.S. Application Data

(60) Provisional application No. 62/562,348, filed on Sep. 22, 2017.

(51) Int. Cl.
H04W 76/15 (2018.01)
H04W 8/24 (2009.01)
H04W 28/02 (2009.01)
H04L 5/00 (2006.01)
H04B 7/0413 (2017.01)
(Continued)

(52) U.S. Cl.
CPC ......... H04W 76/15 (2018.02); H04L 5/0091 (2013.01); H04W 8/24 (2013.01); H04W 28/0215 (2013.01); H04W 28/0268 (2013.01); H04B 7/0413 (2013.01); H04W 4/70 (2018.02); H04W 36/0069 (2018.08)

(58) Field of Classification Search
CPC .... H04B 7/0413; H04L 5/00; H04W 28/0215; H04W 28/0268; H04W 36/0069; H04W 4/70; H04W 76/15; H04W 8/24
See application file for complete search history.

(56) References Cited

U.S. PATENT DOCUMENTS

2018/0227088 A1* 8/2018 Bhattad .............. H04L 1/1819
2018/0343697 A1* 11/2018 Hsu ..................... H04W 76/27

OTHER PUBLICATIONS

"UE Categories for NR and LTE-NR Dual Connectivity", 3GPP TSG-RAN Meeting #76, RP-170993, Agenda Item: 9.2.1, NTT Docomo Inc, Jun. 5-8, 2017, 1 pages.

(Continued)

Primary Examiner — Ayaz R Sheikh
Assistant Examiner — Debebe A Asefa
(74) Attorney, Agent, or Firm — Nokia Technologies Oy

(57) ABSTRACT

A technique includes establishing, by a user device, a first connection with a first base station that is associated with a first radio access technology; sending, to the first base station, user device capability information including at least information indicating a first stand-alone peak data rate supported by the user device for the first radio access technology and information indicating a second stand-alone peak data rate supported by the user device for a second radio access technology; establishing a second connection between the user device and a second base station as part of a multi-radio access technology dual connectivity session with the user device; and receiving, by the user device from the second base station, resources for the second connection in accordance with a configured peak data rate for the second connection that is less than a stand-alone peak data rate for the second radio access technology.

14 Claims, 11 Drawing Sheets

Example Wireless Network 130

(51) Int. Cl.
    *H04W 4/70*     (2018.01)
    *H04W 36/00*     (2009.01)

(56) References Cited

OTHER PUBLICATIONS

WO PCT Application No. PCT/US2017/046620, "User Equipment Category Signaling in an LTE-5G Configuration", filed on Aug. 11, 2017, pp. 1-33.
"EN-DC UE Category", 3GPP TSG-RAN WG2 Meeting #99, R2-1707838, Agenda item: 10.2.6.2, Qualcomm Incorporated, Aug. 21-25, 2017, 3 pages.
"3rd Generation Partnership Project; Technical Specification Group Radio Access Network; Evolved Universal Terrestrial Radio Access (E-UTRA); User Equipment (UE) radio access capabilities (Release 14)", 3GPP TS 36.306, V14.3.0, Jun. 2017, pp. 1-79.

* cited by examiner

Allowed MR-DC UE categories = {MR-DC$_1$, MR-DC$_2$, ..., MR-DC$_N$}

| MR-DC UE category | LTE operation | NR operation |
|---|---|---|
| MR-DC$_1$ | Single-carrier, 50 Mbps | 4.5 Gbps |
| MR-DC$_2$ | Dual-Carrier, 100 Mbps | 4 Gbps |
| ... | | |
| MR-DC$_N$ | N-carriers, 1 Gbps | 2 Gbps |

FIG. 3

| MR-DC UE category | LTE operation | NR peak data rate |
|---|---|---|
| MR-DC₁ | Single-carrier, 200 Mbps | 4.6 Gbps |
| MR-DC₂ | Dual-Carrier, 400 Mbps | 4.2 Gbps |
| MR-DC₃ | 3-Carrier, 600 Mbps | 4 Gbps |
| MR-DC₄ | 4-Carrier, 800 Mbps | 3.5 Gbps |
| MR-DC₅₊ | 5-Carrier+, 1 Gbps | 3 Gbps |

FIG. 4

Example table on UE categories

| MR-DC UE category | RF allocation | NR peak data rate |
|---|---|---|
| MR-DC₁ | Single-carrier 10 MHz | 4.8 Gbps |
| MR-DC₂ | Single-carrier 20 MHz | 4.6 Gbps |
| MR-DC₃ | Dual-Carrier up to 40 MHz | 4.2 Gbps |
| MR-DC₃ | 3-Carrier, up to 60 MHz | 4 Gbps |
| MR-DC₄ | 4-Carrier, up to 80 MHz | 3.5 Gbps |
| MR-DC₅₊ | 5-Carrier+, 100 MHz or more | 3 Gbps |

FIG. 5

SIGNALING FOR MULTIPLE RADIO ACCESS TECHNOLOGY DUAL CONNECTIVITY IN WIRELESS NETWORK

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the Long Term Evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. A goal of 5G is to provide significant improvement in wireless performance, which may include new levels of data rate, latency, reliability, and security. 5G NR may also scale to efficiently connect the massive Internet of Things (IoT), and may offer new types of mission-critical services.

SUMMARY

According to an example implementation, a method includes establishing, by a first base station, a first connection with a user device, the first base station associated with a first radio access technology; receiving, by the first base station from the user device, user device capability information including at least information indicating a first stand-alone peak data rate supported by the user device for the first radio access technology and information indicating a second stand-alone peak data rate supported by the user device for a second radio access technology; determining, based on the user device capability information, a first multi-radio access technology dual connectivity configuration for a first connection between first base station and the user device, including a configured number of first radio access technology carriers to be used for the first connection; sending, by the first base station to a second base station, a multi-radio access technology dual connectivity setup request, including at least a portion of the user device capability information and the configured number of carriers for the first connection, to request a second connection to be established between the user device and the second base station, the second base station associated with a second radio access technology that is different from the first radio access technology; receiving, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than the second stand-alone peak data rate supported by the user device for a second radio access technology; and sending, by the first base station to the user device, a reconfiguration request to the user device to cause the user device to establish the second connection with the second base station associated with the second radio access technology.

According to an example implementation, an apparatus includes at least one processor and at least one memory including computer instructions, when executed by the at least one processor, cause the apparatus to: establish, by a first base station, a first connection with a user device, the first base station associated with a first radio access technology; receive, by the first base station from the user device, user device capability information including at least information indicating a first stand-alone peak data rate supported by the user device for the first radio access technology and information indicating a second stand-alone peak data rate supported by the user device for a second radio access technology; determine, based on the user device capability information, a first multi-radio access technology dual connectivity configuration for a first connection between first base station and the user device, including a configured number of first radio access technology carriers to be used for the first connection; send, by the first base station to a second base station, a multi-radio access technology dual connectivity setup request, including at least a portion of the user device capability information and the configured number of carriers for the first connection, to request a second connection to be established between the user device and the second base station, the second base station associated with a second radio access technology that is different from the first radio access technology; receive, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than the second stand-alone peak data rate supported by the user device for a second radio access technology; and send, by the first base station to the user device, a reconfiguration request to the user device to cause the user device to establish the second connection with the second base station associated with the second radio access technology.

According to an example implementation, an apparatus includes means for establishing, by a first base station, a first connection with a user device, the first base station associated with a first radio access technology; means for receiving, by the first base station from the user device, user device capability information including at least information indicating a first stand-alone peak data rate supported by the user device for the first radio access technology and information indicating a second stand-alone peak data rate supported by the user device for a second radio access technology; means for determining, based on the user device capability information, a first multi-radio access technology dual connectivity configuration for a first connection between first base station and the user device, including a configured number of first radio access technology carriers to be used for the first connection; means for sending, by the first base station to a second base station, a multi-radio access technology dual connectivity setup request, including at least a portion of the user device capability information and the configured number of carriers for the first connection, to request a second connection to be established between the user device and the second base station, the second base station associated with a second radio access technology that is different from the first radio access technology; means for receiving, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than the second stand-alone peak data rate supported by the user device for a second radio access technology; and means for sending, by the first base station to the user device, a reconfiguration request to the user device to cause the user device to establish the second connection with the second base station associated with the second radio access technology.

According to an example implementation, a computer program product includes a computer-readable storage medium and storing executable code that, when executed by at least one data processing apparatus, is configured to cause the at least one data processing apparatus to perform a method including: establishing, by a first base station, a first connection with a user device, the first base station associated with a first radio access technology; receiving, by the first base station from the user device, user device capability information including at least information indicating a first stand-alone peak data rate supported by the user device for the first radio access technology and information indicating a second stand-alone peak data rate supported by the user device for a second radio access technology; determining, based on the user device capability information, a first multi-radio access technology dual connectivity configuration for a first connection between first base station and the user device, including a configured number of first radio access technology carriers to be used for the first connection; sending, by the first base station to a second base station, a multi-radio access technology dual connectivity setup request, including at least a portion of the user device capability information and the configured number of carriers for the first connection, to request a second connection to be established between the user device and the second base station, the second base station associated with a second radio access technology that is different from the first radio access technology; receiving, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than the second stand-alone peak data rate supported by the user device for a second radio access technology; and sending, by the first base station to the user device, a reconfiguration request to the user device to cause the user device to establish the second connection with the second base station associated with the second radio access technology.

According to an example implementation, a method includes receiving, by a second base station from a first base station, a multi-radio access technology dual connectivity setup request, including a configured number of carriers for a first connection between the first base station and the user device and user device capability information indicating at least a stand-alone peak data rate supported by the user device for a second radio access technology, wherein the first base station is associated with a first radio access technology, and the second base station is associated with the second radio access technology that is different from the first radio access technology; determining, by the second base station based on the user device capability information and the configured number of carriers for the first connection, a multi-radio access technology dual connectivity configuration for a second connection to be established between second base station and the user device, the second multi-radio access technology dual connectivity configuration including at least a configured peak data rate for the second connection that is less than the stand-alone peak data rate supported by the user device for the second radio access technology; and scheduling, by the second base station, resources for the user device for the second connection in accordance with the configured peak data rate for the second connection.

According to an example implementation, an apparatus includes at least one processor and at least one memory including computer instructions, when executed by the at least one processor, cause the apparatus to: receive, by a second base station from a first base station, a multi-radio access technology dual connectivity setup request, including a configured number of carriers for a first connection between the first base station and the user device and user device capability information indicating at least a stand-alone peak data rate supported by the user device for a second radio access technology, wherein the first base station is associated with a first radio access technology, and the second base station is associated with the second radio access technology that is different from the first radio access technology; determine, by the second base station based on the user device capability information and the configured number of carriers for the first connection, a multi-radio access technology dual connectivity configuration for a second connection to be established between second base station and the user device, the second multi-radio access technology dual connectivity configuration including at least a configured peak data rate for the second connection that is less than the stand-alone peak data rate supported by the user device for the second radio access technology; and schedule, by the second base station, resources for the user device for the second connection in accordance with the configured peak data rate for the second connection.

According to an example implementation, an apparatus includes means for receiving, by a second base station from a first base station, a multi-radio access technology dual connectivity setup request, including a configured number of carriers for a first connection between the first base station and the user device and user device capability information indicating at least a stand-alone peak data rate supported by the user device for a second radio access technology, wherein the first base station is associated with a first radio access technology, and the second base station is associated with the second radio access technology that is different from the first radio access technology; means for determining, by the second base station based on the user device capability information and the configured number of carriers for the first connection, a multi-radio access technology dual connectivity configuration for a second connection to be established between second base station and the user device, the second multi-radio access technology dual connectivity configuration including at least a configured peak data rate for the second connection that is less than the stand-alone peak data rate supported by the user device for the second radio access technology; and means for scheduling, by the second base station, resources for the user device for the second connection in accordance with the configured peak data rate for the second connection.

According to an example implementation, a computer program product includes a computer-readable storage medium and storing executable code that, when executed by at least one data processing apparatus, is configured to cause the at least one data processing apparatus to perform a method including: receiving, by a second base station from a first base station, a multi-radio access technology dual connectivity setup request, including a configured number of carriers for a first connection between the first base station and the user device and user device capability information indicating at least a stand-alone peak data rate supported by the user device for a second radio access technology, wherein the first base station is associated with a first radio access technology, and the second base station is associated with the second radio access technology that is different from the first radio access technology; determining, by the second base station based on the user device capability information and the configured number of carriers for the first connection, a multi-radio access technology dual connectivity configuration for a second connection to be established between second base station and the user device, the second multi-radio access technology dual connectivity configuration including at least a configured peak data rate for the second connection that is less than the stand-alone peak data rate supported by the user device for the second radio access technology; and scheduling, by the second base station, resources for the user device for the second connection in accordance with the configured peak data rate for the second connection.

According to an example implementation, a method includes establishing, by a user device, a first connection with a first base station, the first base station associated with a first radio access technology; sending, by the user device to the first base station, user device capability information including at least information indicating a first stand-alone peak data rate supported by the user device for the first radio access technology and information indicating a second stand-alone peak data rate supported by the user device for a second radio access technology; receiving, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than the second stand-alone peak data rate supported by the user device for the second radio access technology; establishing the second connection between the user device and the second base station as part of a multi-radio access technology dual connectivity session with the user device; and receiving, by the user device from the second base station, resources for the second connection in accordance with the configured peak data rate for the second connection.

According to an example implementation, an apparatus includes at least one processor and at least one memory including computer instructions, when executed by the at least one processor, cause the apparatus to: establish, by a user device, a first connection with a first base station, the first base station associated with a first radio access technology; send, by the user device to the first base station, user device capability information including at least information indicating a first stand-alone peak data rate supported by the user device for the first radio access technology and information indicating a second stand-alone peak data rate supported by the user device for a second radio access technology; receive, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than the second stand-alone peak data rate supported by the user device for the second radio access technology; establish the second connection between the user device and the second base station as part of a multi-radio access technology dual connectivity session with the user device; and receive, by the user device from the second base station, resources for the second connection in accordance with the configured peak data rate for the second connection.

According to an example implementation, an apparatus includes means for establishing, by a user device, a first connection with a first base station, the first base station associated with a first radio access technology; means for sending, by the user device to the first base station, user device capability information including at least information indicating a first stand-alone peak data rate supported by the user device for the first radio access technology and information indicating a second stand-alone peak data rate supported by the user device for a second radio access technology; means for receiving, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than the second stand-alone peak data rate supported by the user device for the second radio access technology; means for establishing the second connection between the user device and the second base station as part of a multi-radio access technology dual connectivity session with the user device; and means for receiving, by the user device from the second base station, resources for the second connection in accordance with the configured peak data rate for the second connection.

According to an example implementation, a computer program product includes a computer-readable storage medium and storing executable code that, when executed by at least one data processing apparatus, is configured to cause the at least one data processing apparatus to perform a method including: establishing, by a user device, a first connection with a first base station, the first base station associated with a first radio access technology; sending, by the user device to the first base station, user device capability information including at least information indicating a first stand-alone peak data rate supported by the user device for the first radio access technology and information indicating a second stand-alone peak data rate supported by the user device for a second radio access technology; receiving, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than the second stand-alone peak data rate supported by the user device for the second radio access technology; establishing the second connection between the user device and the second base station as part of a multi-radio access technology dual connectivity session with the user device; and receiving, by the user device from the second base station, resources for the second connection in accordance with the configured peak data rate for the second connection.

According to an example implementation, a method includes establishing, by a user device, a first connection with a first base station that is associated with a first radio access technology; sending, by the user device to the first base station, user device capability information including at least information indicating a first stand-alone peak data rate supported by the user device for the first radio access technology and information indicating a second stand-alone peak data rate supported by the user device for a second radio access technology; establishing a second connection between the user device and a second base station as part of a multi-radio access technology dual connectivity session with the user device, wherein a configured peak data rate for the second connection is based at least on a number of carriers configured for the first connection and is less than a stand-alone peak data rate for the second radio access technology; and receiving, by the user device from the second base station, resources for the second connection in accordance with the configured peak data rate for the second connection.

According to an example implementation, an apparatus includes at least one processor and at least one memory including computer instructions, when executed by the at least one processor, cause the apparatus to: establish, by a user device, a first connection with a first base station that is associated with a first radio access technology; send, by the user device to the first base station, user device capability information including at least information indicating a first stand-alone peak data rate supported by the user device for the first radio access technology and information indicating a second stand-alone peak data rate supported by the user device for a second radio access technology; establish a second connection between the user device and a second base station as part of a multi-radio access technology dual connectivity session with the user device, wherein a configured peak data rate for the second connection is based at least on a number of carriers configured for the first connection and is less than a stand-alone peak data rate for the second radio access technology; and receive, by the user device from the second base station, resources for the second connection in accordance with the configured peak data rate for the second connection.

According to an example implementation, an apparatus includes means for establishing, by a user device, a first connection with a first base station that is associated with a first radio access technology; means for sending, by the user device to the first base station, user device capability information including at least information indicating a first stand-alone peak data rate supported by the user device for the first radio access technology and information indicating a second stand-alone peak data rate supported by the user device for a second radio access technology; means for establishing a second connection between the user device and a second base station as part of a multi-radio access technology dual connectivity session with the user device, wherein a configured peak data rate for the second connection is based at least on a number of carriers configured for the first connection and is less than a stand-alone peak data rate for the second radio access technology; and means for receiving, by the user device from the second base station, resources for the second connection in accordance with the configured peak data rate for the second connection.

According to an example implementation, a computer program product includes a computer-readable storage medium and storing executable code that, when executed by at least one data processing apparatus, is configured to cause the at least one data processing apparatus to perform a method including: establishing, by a user device, a first connection with a first base station that is associated with a first radio access technology; sending, by the user device to the first base station, user device capability information including at least information indicating a first stand-alone peak data rate supported by the user device for the first radio access technology and information indicating a second stand-alone peak data rate supported by the user device for a second radio access technology; establishing a second connection between the user device and a second base station as part of a multi-radio access technology dual connectivity session with the user device, wherein a configured peak data rate for the second connection is based at least on a number of carriers configured for the first connection and is less than a stand-alone peak data rate for the second radio access technology; and receiving, by the user device from the second base station, resources for the second connection in accordance with the configured peak data rate for the second connection.

The details of one or more examples of implementations are set forth in the accompanying drawings and the description below. Other features will be apparent from the description and drawings, and from the claims.

BRIEF DESCRIPTION OF THE DRAWINGS

FIG. 3 is a diagram illustrating multi-RAT (radio access technology) dual connectivity (MR-DC) UE categories according to an example implementation.

FIG. 4 is a diagram illustrating multi-RAT (radio access technology) dual connectivity (MR-DC) UE categories according to another example implementation.

FIG. 5 is a diagram illustrating multi-RAT (radio access technology) dual connectivity (MR-DC) UE categories according to another example implementation.

DETAILED DESCRIPTION

Figure 1:
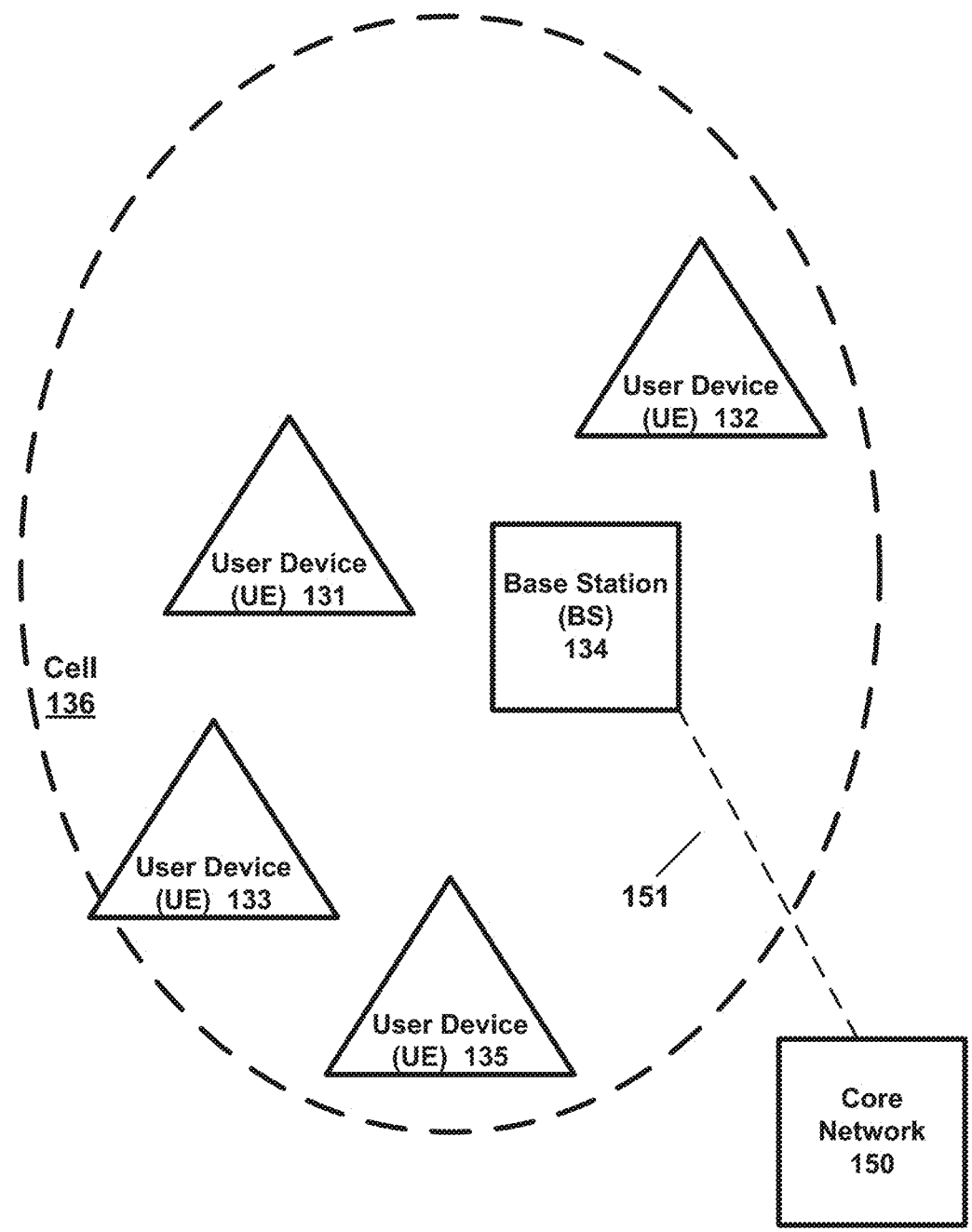
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a New Radio (NR) or 5G Node B (gNB), or a network node. At least part of the functionalities of an access point (AP), base station (BS) or (e)Node B (eNB)/5G Node B (gNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), wireless relaying including self-backhauling, D2D (device-to-device) communications, and ultra-reliable and low-latency communications (URLLC). Scenarios may cover both traditional licensed band operation as well as unlicensed band operation.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (NR or 5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability)

The various example implementations may be applied to a wide variety of wireless technologies or wireless networks, such as LTE, LTE-A, NR/5G, cmWave, and/or mmWave band networks, IoT, MTC, eMTC, eMBB, URLLC, etc., or any other wireless network or wireless technology. These example networks, technologies or data service types are provided only as illustrative examples.

There may be different types of radio access technologies (RATs) that may be used by a wireless network to provide communications services. Example RATs may include EUTRAN (Evolved UTRA, which may also be referred to as Long Term Evolution/LTE), New Radio (NR or 5G), Wireless Local Area Network (WLAN, Wi-Fi, or IEEE 802.11), by way of illustrative examples. These are merely some examples, and other RATs may also be available and/or used by a wireless network.

According to an example implementation, a UE may operate in a stand-alone mode in which the UE is connected to a BS of only one of these RATs. For example, a UE may be connected to either a LTE BS, or to a NR (New Radio or 5G) BS, but not both, for a stand-alone mode.

According to another example implementation, a UE may operate in a multi-RAT dual connectivity (MR-DC) mode or MR-DC session in which the UE may be connected to nodes or BSs of multiple RATs (e.g., two RATs). There may be advantages for a UE that is connected to multiple RATs (MR-DC), such as possibly, e.g., higher overall data throughput or higher data rates, higher reliability for data transmission, improved handover procedures, reduced handover interruption time, fewer dropped connections, etc. Thus, for example, when a UE is operating in a MR-DC session (or MR-DC mode), a UE may have a first connection to a first BS for a first RAT, and a second connection to a second BS for a second RAT. In an illustrative example implementation of MR-DC, a UE may have a first connection to a EUTRAN/LTE BS and a second connection to a NR (5G) BS. This type of MR-DC may be referred to as EUTRAN NR-Dual Connectivity (EN-DC). In an illustrative example of EN-DC, the LTE BS (eNB) may be considered a master node or master BS, while the NR BS (gNB) may be considered a secondary node or secondary BS. For example, the UE may first establish a connection to the LTE BS, and the LTE BS may assist in coordinating the setting up or establishment of the second connection between the UE and the NR BS.

When a UE is operating in a stand-alone mode, the UE may typically report its capabilities to a BS, which may indicate UE support for a variety of different features or capabilities. A UE may report its capabilities, e.g., based on a BS request or autonomously according to pre-defined conditions. For example, a UE may provide its capabilities to a BS, including, e.g., (stand-alone) maximum (or peak)

data rate supported by the UE, bands or band combinations supported by the UE, supported MCS (modulation and coding schemes), whether or not carrier aggregation (CA) is supported by the UE, whether or not dual connectivity (e.g., MR-DC or EN-DC) is supported by the UE, a maximum number of supported layers for spatial multiplexing, etc. These are merely a few examples of the types of information or capabilities that may be indicated when a UE reports its capabilities to a BS.

For example, for LTE, a UE may report its (or at least some of its) UE capabilities by sending an uplink (UL) UE category and a downlink (DL) UE category to a LTE BS, where each UE category may correspond to or indicate a set of UE capabilities. For example, each UE category may indicate (or correspond to) a (stand-alone) LTE peak data rate supported by the UE, supported MCS (modulation and coding scheme), and a maximum number of supported layers for spatial multiplexing. For example, a LTE UE category may indicate or correspond to a maximum (or peak) number of bits per transmission time interval (TTI), which may be considered the peak data rate, or which may be converted to a peak data rate (e.g., bits per second), based on the length of the TTI (e.g., 1 ms). A UE (that is connected to a LTE BS) may, for example, indicate its UL and DL capabilities by indicating a UE category for both UL and DL.

Similarly, according to an example implementation, a NR UE that is connected to a NR BS may report its UE capabilities to the NR BS, e.g., by reporting or indicating (for both UL and DL) either a NR UE category or by indicating values for one or more parameters for specific capabilities, e.g., such as information identifying a (NR stand-alone) NR peak data rate supported by the UE, supported bands, supported MCS, information indicating support for MR-DC and/or EN-DC, etc. These are some examples of UE capabilities that may be indicated by a UE to a NR BS (and possibly for other RATs), for example.

For example, the UE category (indicating a peak data rate supported by the UE in supported band combinations for each of UL and DL) and the NR capabilities information (e.g., NR UE category or other NR capabilities information that may be provided) indicating a NR UE peak data rate may typically indicate a stand-alone peak data rates. As noted, the stand-alone peak data rate is the peak (or maximum) data rate that the UE can support for this RAT when connected to a BS in stand-alone mode (UE connected via only one RAT).

However, one or more stand-alone peak data rates reported by a UE may not necessarily be applicable (not necessarily supported by the UE) when the UE is connected in a MR-DC or EN-DC mode. For example, the stand-alone peak data rates reported or indicated by the UE for LTE and NR may not necessarily be supported by the UE when the UE is operating in a EN-DC mode. This may be because, for example, various resources within a UE (e.g., processing resources, memory resources, and other resources) may be shared between the two RATs and two connections (e.g., the LTE connection and the NR connection) for EN-DC or MR-DC, which may reduce the amount of resources available to the UE to support each or one or both of the two RAT connections (e.g., LTE and NR connections).

Thus, in general, the overall peak data rate supported by a UE in MR-DC or EN-DC may not be a simple sum of the stand-alone data rates, e.g., since there may not be sufficient resources at the UE to support the two stand-alone peak data rates for the two RATs. Therefore, when connected in MR-DC (such as EN-DC) mode, the UE may only support a dual connectivity (DC) adjusted peak data rate for one or more of the RATs, where a DC adjusted peak data rate for a RAT may typically be less than the stand-alone peak data rate for the RAT.

Also, when a UE is operating in a MR-DC mode (such as EN-DC mode), it may be advantageous to allow one or both BSs (master BS and secondary BS) to determine a DC adjusted peak data rate for each of the RATs (e.g., a dual connectivity adjusted peak data rate for each of LTE and/or NR, for EN-DC). As described in greater detail hereinbelow, the master BS (e.g., LTE BS) and/or the secondary BS (e.g., NR BS) may determine a DC-adjusted peak data rate for a RAT either by: 1) the UE explicitly reporting such DC-adjusted peak data rate for the RAT within its UE capabilities that are reported to a BS; or 2) the master BS and/or secondary BS may determine the DC-adjusted peak data rate for a RAT based on the reported UE capabilities (e.g., including based on at least the UE supported stand-alone peak data rates for one or both the RATs, and possibly other information).

Thus, according to an illustrative example implementation, a DC-adjusted peak data rate that may be supported by a UE operating in EN-DC (LTE NR-dual connectivity) mode may typically be less than a stand-alone peak data rate that can be supported by the UE operating in stand-alone mode, e.g., for at least one of the connections or RATs. The DC-adjusted peak data rate may include a peak data rate that has been adjusted (e.g., decreased) based on the UE operating in a dual connectivity mode.

According to an example implementation, either one RAT or both RATs for a MR-DC (e.g., EN-DC) session for a UE may include a DC-adjusted peak data rate supported by the UE that is less than a stand-alone peak data rate for the RAT. In one illustrative example implementation, both the EN-DC adjusted peak data rate is less than the stand-alone LTE peak data rate, and the EN-DC adjusted NR peak data rate is less than the stand-alone NR peak data rate. In another example implementation, the EN-DC adjusted LTE peak data rate is the same as the stand-alone LTE peak data rate, while the EN-DC adjusted NR peak data rate is less than the stand-alone NR peak data rate. Thus, in the second example here, only the EN-DC NR peak data rate is less than the stand-alone NR peak data rate (and the LTE peak data rate is not adjusted for EN-DC). These are merely some illustrative examples, and other examples may be used.

According to an example implementation, Table 1 below provides an example set of peak data rates that illustrate how one or both DC-adjusted peak data rates (e.g., for a UE operating in a EN-DC session or mode) may be less than the UE's stand-alone peak data rates. Assume, for example, that the UE supports 1 Gbps over LTE (as a stand-alone peak data rate), and 5 Gbps over LTE (as a stand-alone peak data rate). However, as shown in the example of Table 1, the UE might only support 800 Mbps over LTE and 3 Gbps over NR when operating under EN-DC, or 100 Mbps over LTE and 4 Gbps over NR, or 50 Mbps over LTE and 4.5 Gbps over NR, and so on.

TABLE 1

| Use case | LTE peak data rate [Mbps] | NR peak data rate [Mbps] |
| --- | --- | --- |
| Stand-alone LTE | 1000 (e.g., 4 carrier) | — |
| Stand-alone NR | — | 5000 |
| EN-DC, option 1 | 800 (e.g., 4 carrier) | 3000 |

TABLE 1-continued

| Use case | LTE peak data rate [Mbps] | NR peak data rate [Mbps] |
|---|---|---|
| EN-DC, option 2 | 300 (e.g., 3 carrier) | 4000 |
| EN-DC, option 3 | 50 (e.g., 1 or 2 carriers) | 4500 |

Figure 2:
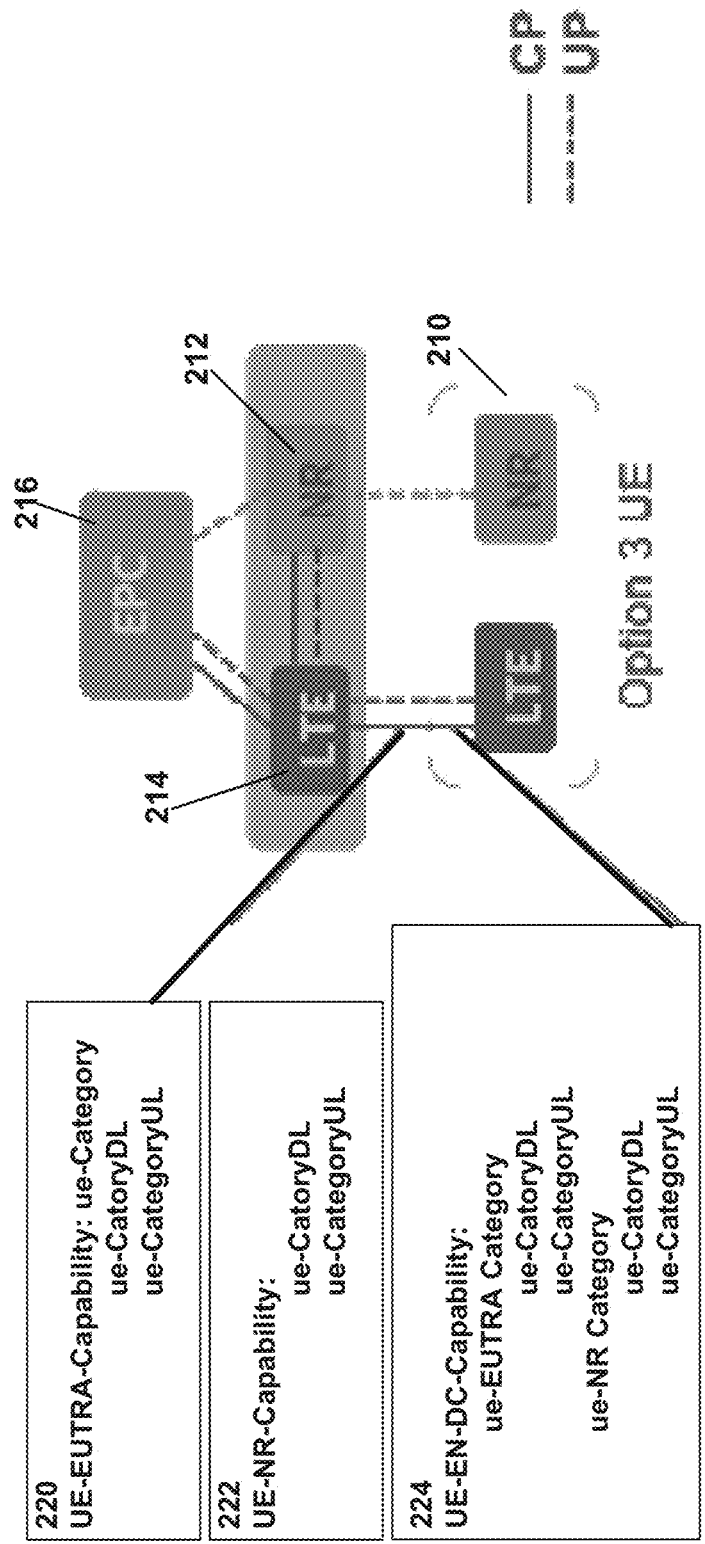
FIG. 2 is a diagram illustrating a user device (UE) operating in a dual connectivity session according to an example implementation.

FIG. 2 is a diagram illustrating a user device (UE) operating in a dual connectivity session according to an example implementation. As shown in FIG. 2, a UE 210 may have a first connection with a LTE BS 214 and a second connection with a NR BS 212. BSs 212, 214 may be connected to a core network (Evolved Packet Core (EPC)) 216. For example, after establishing the connection to LTE BS (master BS) 214, the UE 210 may report its UE capabilities to the LTE (master) BS 214, including: 1) stand-alone UE capabilities for LTE (220), including, e.g., UE category DL and a UE category UL (which may indicate or correspond to a stand-alone LTE peak data rate supported by the UE for DL and UL); 2) stand-alone UE capabilities for NR (222), which may include, e.g., either NR categories for UL and DL or information that may describe one or more parameters or capabilities for the UE (such as information indicating a stand-alone NR peak data rate supported by the UE); and, 3) EN-DC adjusted information for both LTE and NR (224), which may include a EN-DC adjusted LTE UE category for DL and UL (e.g., which indicate the EN-DC adjusted LTE peak data rates for DL and UL), and either EN-DC adjusted NR categories for DL and UL or information identifying one or more EN-DC adjusted parameters for the UE (such as a EN-DC adjusted NR peak data rate supported by the UE).

Thus, as shown in FIG. 2, in an example implementation, when a UE reports its UE capabilities to a BS, the UE may also report EN-DC adjusted information for multiple RATs (e.g., for both LTE and NR) (224), which may include a EN-DC adjusted LTE UE category for DL and UL (e.g., which indicate the EN-DC adjusted LTE peak data rates for DL and UL), and either EN-DC adjusted NR categories for DL and UL or information identifying one or more EN-DC adjusted parameters for the UE (such as a EN-DC adjusted NR peak data rate supported by the UE). Thus, as one possible example implementation, the UE may explicitly report MR-DC (e.g., EN-DC) adjusted peak data rates for one or more RATs, as shown by block 224 in FIG. 2.

Also, in FIG. 2, CP refers to control plane data (control signals), and UP refers to user plane data. Thus, in the illustrative example shown in FIG. 2, LTE BS 214 may be a master BS (or master node) through which all control signaling may at least initially be sent for the UE, and the LTE BS 214 may assist with setting up a second connection between the UE 210 and NR BS 212 as part of a EN-DC session for the UE. The arrangement shown in FIG. 2 is merely an illustrative example, and other arrangements or configurations may be provided.

Alternatively, a more efficient approach (e.g., decreasing the amount of UE-BS signaling) may be used in which the MR-DC (e.g., EN-DC) adjusted peak data rates for one or more RATs are not explicitly reported within the UE capabilities. Rather, one or both BSs may determine the MR-DC (e.g., EN-DC) adjusted peak data rates for one or more RATs based on a set of rules or a lookup table, based on information provided to the BS. In such an illustrative example, at least some UE capability information may be reported to or provided to each BS, such as at least a portion of: UE LTE capability information (e.g., indicating a LTE stand-alone peak data rate) and UE NR capability information (e.g., which may include information indicating a NR stand-alone peak data rate), and possibly other information. Each BS may then determine a DC-adjusted peak data rate, e.g., using a set of rules or a lookup table, etc.

According to an example implementation, a first connection may be established between UE 210 and LTE BS 214. UE 210 may report or send its UE capability information to a LTE BS 214. For example, the UE capability information may include a LTE UE category indicating a LTE stand-alone peak data rate, and information indicating a NR stand-alone peak data rate that are supported by the UE. The LTE BS 214 may determine a first dual connectivity (DC) configuration for a first connection between the LTE BS 214 and the UE 210, including a configured number of (LTE) carriers and/or a configured LTE peak data rate for the first connection between the LTE BS 214 and the UE (of the EN-DC session). In an illustrative example, a DC-adjusted LTE peak data rate may be the same as (or may be less than) the stand-alone LTE peak data rate, and the configured LTE peak data rate may be the same as or less than the DC-adjusted LTE peak data rate. In addition, the LTE BS may send to the NR BS 212 a EN-DC setup request (e.g., to request NR BS 212 to setup a second connection with the UE 210, as part of the EN-DC session with the UE). The EN-DC setup request may include, e.g., one or more of the following: at least a portion of the UE capability information for the UE 210, and the configured number of LTE carriers and/or the configured LTE peak data rate for the first connection (for example, the configured LTE peak data rate for the first connection may already correspond to the DC-adjusted peak data rate for LTE, since it may be provided at DC setup request). The NR BS 212 may then determine a DC-adjusted NR peak data rate, e.g., based on a set of rules, or a lookup table or other technique, based on information received from the LTE BS (e.g., based on the configured number of LTE carriers and/or the configured LTE peak data rate for the first connection, or based on a MR-DC UE category that may have been provided by the LTE BS 214). The NR BS 212 may then determine a second dual connectivity (DC) configuration for the second connection (to be established) between the UE and the NR BS 212, e.g., including a configured NR peak data rate for the second connection, which may be less than or equal to the DC-adjusted NR peak data rate, for example. The configured NR peak data rate may be determined based on the configured number of LTE carriers and/or the configured LTE peak data rate for the first connection, and/or based on a MR-DC UE category that may have been provided by the LTE BS 214.

Also, in some cases, it may not be necessary for the NR BS 212 to determine a DC-adjusted NR peak data rate. Rather, the NR BS 212 may simply use a lookup table or a set of rules to determine the configured NR peak data rate based on the configured number of LTE carriers and/or the configured LTE peak data rate for the first connection, and/or based on a MR-DC UE category that may have been provided by the LTE BS 214. The NR BS 212 may then establish the second connection with the UE 210 based on the second DC configuration (e.g., including the configured NR peak data rate) for the second connection.

FIG. 3 is a diagram illustrating multi-RAT (radio access technology) dual connectivity (MR-DC) UE categories according to an example implementation. As shown in the example of FIG. 3, a MR-DC$_1$ UE category may indicate or correspond to a configured single LTE carrier with a LTE peak data rate of 50 Mbps and a DC-adjusted NR peak data rate of 4.5 Gbps; MR-DC$_2$ indicates or corresponds to a dual LTE carrier with a LTE peak data rate of 100 Mbps, and a DC-adjusted NR peak data rate of 4 Gbps; MR-DC$_N$ indicates or corresponds to a N-carrier LTE carrier with a LTE peak data rate of 1 Gbps, and a DC-adjusted NR peak data rate of 2 Gbps, etc. Note that the LTE peak data rates indicated in FIG. 3 may be either DC-adjusted LTE peak data rates (in the case where the LTE peak data rates are adjusted based on DC), or simply the stand-alone LTE peak data rates for each number of carriers. Thus, the LTE peak data rates indicated in FIG. 3 may or may not be DC-adjusted.

According to an example implementation with respect to the table of FIG. 3, one assumption is that stand-alone NR peak data rate is 5.0 Gbps; stand-alone LTE peak data rate for N carriers is 1 Gbps; and stand-alone LTE peak data rate is 150 Mbps for 1 carrier (which is adjusted down to 50 Mbps in this example, and some of the other LTE carrier numbers have adjusted peak data rates). In an example implementation, at least one of the peak data rates would be adjusted for RAT 1 and RAT 2; although, as a practical matter, LTE data rates are not likely to be adjusted for EN-DC, due to fixed UE categories. At least, a different (DC-adjusted) NR peak data rate may be determined. For example, a DC-adjusted NR peak data rate may be determined by NR BS 212 (or signaled by LTE BS 214) based on the configured number of LTE carriers.

According to an example implementation, the information of the table illustrated in FIG. 3 may be known by both LTE BS 214 and NR BS 212 (and possibly UE 210). This information of Table 3 may be known in advance by the nodes, may be retrieved from the master BS (LTE BS 214 in this example) or retrieved from the core network, etc. Thus, the LTE BS 214 may send the NR BS 212 a EN-DC setup request (e.g., to request NR BS 212 to setup a second connection with the UE 210, as part of the EN-DC session with the UE). The EN-DC setup request may include, e.g., the configured number of LTE carriers and/or the configured LTE peak data rate (which may be the DC-adjusted peak data rate) for the first connection, and/or a MR-DC UE category (e.g., MR-DC$_1$, MR-DC$_2$, . . . , as shown in the example of FIG. 3). According to an example implementation, the NR BS 212 may then determine a DC-adjusted NR peak data rate, e.g., based on Table 3, and then selects a configured NR peak data rate (for the second connection) that is less than or equal to the DC-adjusted NR peak data rate indicated by the table of FIG. 3. For example, NR BS 212 may perform a lookup into the table of FIG. 3, based on the indicated number of LTE carriers, indicated LTE peak data rate, or based on the indicate MR-DC UE category, to identify a corresponding DC-adjusted NR peak data rate. This DC-adjusted NR peak data rate indicates the NR peak data rate that the UE can handle or support for a EN-DC session. Thus, in this illustrative example, the NR BS 212 can provide (configure for the second connection) a NR peak data rate up to, but not greater than, this DC-adjusted NR peak data rate, according to an example implementation. Then, the NR BS may determine a configured NR peak data rate for the second connection that is less than or equal to the determined DC-adjusted NR peak data rate (e.g., the NR BS 212 may only have resources itself to provide a portion of the indicated DC-adjusted NR peak data rate). For example, if the LTE BS 214 indicates (e.g., via EN-DC setup request message sent to NR BS 212) that two LTE carriers are supported for the LTE connection with UE 210, the NR BS 212 may then perform a lookup into the table of FIG. 3 and determine the DC-adjusted NR peak data rate that corresponds to dual LTE carriers is a maximum (or peak) NR data rate of 4 Gbps. Thus, in this example, the DC-adjusted NR peak data rate may be determined based on the number of configured LTE carriers for the EN-DC session.

The advantages of organizing the table of FIG. 3 based on the number of LTE carriers may include that the NR BS 212 may allow decreased signaling overhead, e.g., the NR BS 212 may only need to be informed of the number of configured LTE carriers for the UE 210 (possibly in addition to other UE capability information that the NR BS 212 may find useful). Thus, in this example, the NR BS 212 may be able to determine a DC-adjusted NR peak data rate based only on the number of LTE carriers indicated by the LTE BS (master BS) 214, e.g., via the EN-DC setup request message sent by the LTE BS 214 to the NR BS 212, for example. Other parameters (e.g., LTE peak data rate, or DC-MR UE category) may alternatively be indicated by LTE BS 214 to NR BS 212 and used by NR BS 212 to determine a DC-adjusted NR peak data rate for the UE.

Alternatively, the LTE BS 214 (master BS) may indicate a total bandwidth requested for the UE; or may indicate a configured bandwidth or configured LTE peak data rate and a requested NR peak data rate. The NR BS 212 may then provide a configured NR peak data rate that may be less than or equal to the requested NR peak data rate. A DC-adjusted NR peak data rate may be determined by NR BS 212 for both uplink (UL) and downlink (DL).

FIG. 4 is a diagram illustrating multi-RAT (radio access technology) dual connectivity (MR-DC) UE categories according to another example implementation. As can be seen, the NR BS 212 may only need to be informed of one of: MR-DC UE category, a maximum number of LTE carriers (or maximum number of configured LTE carriers), or a LTE peak data rate or LTE bandwidth, in order for the NR BS 212 to determine a corresponding DC-adjusted NR peak data rate. Thus, an advantage of simplified signaling may be obtained if the master BS (e.g., LTE BS 214) can indicate (or allow the NR BS 212 to determine) the DC-adjusted NR peak data rate for the UE 210 by merely indicating a number of LTE carriers (or only provide either a LTE peak data rate, or a MR-DC UE category) for the LTE connection for the UE. In the table of FIG. 4, for example, 256 QAM (quadrature amplitude modulation) for single carrier and 2-stream MIMO may be assumed. In addition, the LTE BS 214 (or master BS) may provide an indication to use a specific band, such as an indication to use unlicensed band LTE (LAA), for example, where multiple unlicensed carriers may be available.

FIG. 5 is a diagram illustrating multi-RAT (radio access technology) dual connectivity (MR-DC) UE categories according to another example implementation. In the table of FIG. 5, LTE bandwidth and number of carriers, and a DC-adjusted NR peak data rate are indicated for each of multiple MR-DC UE categories. Thus, in this example, the LTE BS 214 may indicate the DC-adjusted NR peak data rate for a UE by merely indicating the (maximum or peak) LTE bandwidth for the UE, for example, as shown in FIG. 5. Alternatively, the UE may indicate sub-options so that the UE may indicate a supported NR peak data rate per each legacy LTE UE category indication.

According to a first example implementation, both the UE and BS use a table (or set of rules) to determine EN-DC adjusted peak data rates, and thus, no need for UE to explicitly report adjusted peak data rates: For example: UE establishes a connection to a master BS (LTE connection); UE reports its capabilities to master BS via RRC message after establishing a connection to master node, including its stand-alone LTE peak data rate for UL and DL (via reporting a LTE UE configuration(s) for UL and DL); and UE reports its stand-alone NR/5G peak data rates for UL and DL; Specification or standard, known by UE and BS, specifies one of the tables described herein (for example) to indicate how the BS and UE determine an adjusted LTE data rate and/or adjusted NR peak data rate for EN-DC mode, for each of one or more numbers of LTE carriers. LTE peak data rate may or may not change for EN-DC mode. For example, in some cases, only the NR peak data rate changes for EN-DC mode, it is decreased as compared to stand-alone NR peak data rate. LTE peak data rate may also change. Thus, in this illustrative example implementation, there is no need for UE to signal the EN-DC adjusted LTE and NR peak data rates to BS. For example, the UE may indicate a LTE UE category, which indicates a maximum number of LTE carriers supported by the UE.

According to a second example implementation, a UE may actually determine and report an indication to master BS its EN-DC adjusted LTE peak data rates for one or more numbers of carriers (1 carrier—X'; 2 carriers—Y'), and an adjusted NR peak data rate(s), e.g., based on a table that is provided or known by UE and BSs, to allow UE to specify the adjusted NR peak data rate, rather than allow UE and NR BS to each determine adjusted NR peak data rate based on table in specification or standard. Thus, for example, this second example implementation may allow different vendors (manufacturers) of different UEs to specify their own DC-adjusted peak data rates for LTE and NR.

Figure 6:
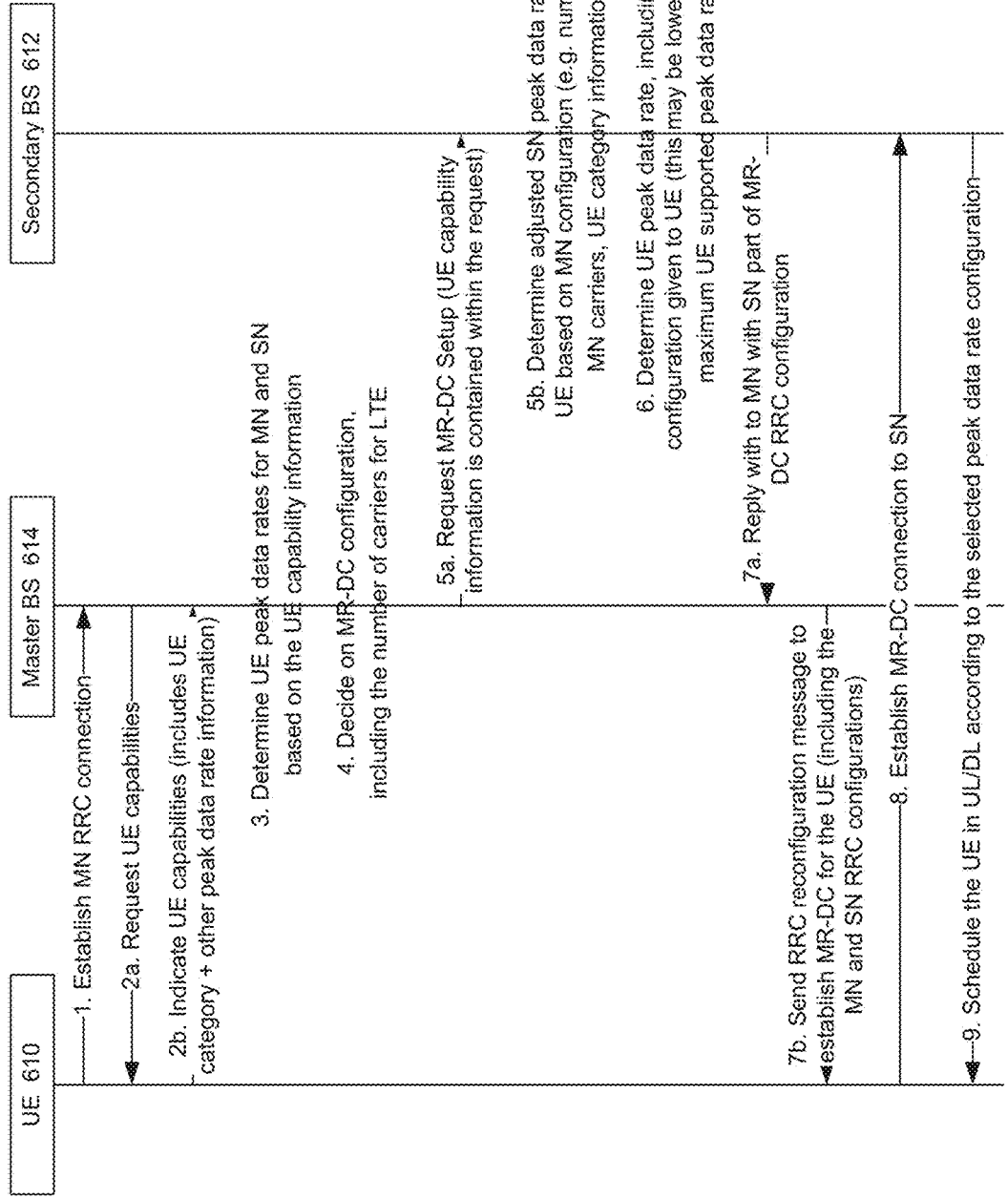
FIG. 6 is a diagram illustrating operation of a system according to an example implementation.

FIG. 6 is a diagram illustrating operation of a system according to an example implementation. A UE may be in communication with a master node or master BS 614 (e.g., which may be a LTE BS) associated with a first RAT (e.g., LTE) and a secondary node or secondary BS 612 (e.g., which may be a NR BS) associated with a second RAT (e.g., NR/5G). At step 1, a connection is established between the UE 610 and the master BS 614.

At step 2a, the master BS 614 sends a request for UE capabilities to UE 610.

At step 2b, the UE 610 may respond by providing its UE capabilities (or UE capability information), e.g., which may include a UE category for the RAT of the master BS 614, and other peak data rate information. For example, the capability information received by the master BS may include or may indicate a first stand-alone peak data rate supported by the UE for the first RAT and a second stand-alone peak data rate supported by the UE for a second RAT. For example, one (or both) of these indicated peak data rates may be indicated by providing a UE category for that RAT(s).

At step 3, the master BS 614 may determine the stand-alone peak data rates supported by the UE for the first and second RATs. In this example, the peak data rate for the first RAT is not adjusted (not decreased) for MR-DC operation, but rather, the stand-alone peak data rate for the first RAT may be used as the peak data rate for the first RAT for the MR-DC session.

At step 4, the master BS 614 may determine a MR-DC configuration for a first connection between the master BS and the UE 610, including a configured number of carriers for the first RAT and first connection (e.g., the configured number of LTE carriers for the UE).

At step 5a, the master BS 614 may send a MR-DC setup request (requesting that the secondary BS 612 establish a connection to the UE 610), including at least a portion of the UE capability information, and the configured number (or maximum number) of carriers configured for the first RAT (e.g., the configured number of LTE carriers for the UE).

At 5b, the secondary BS (e.g., NR BS) 612 may determine a DC-adjusted NR peak data rate based on the configured number of LTE carriers indicated in the MR-DC setup request. For example, see tables of FIGS. 3-5, as illustrative examples that may be used by the secondary BS to determine an adjusted peak data rate for the second RAT (e.g., adjusted NR peak data rate) based on the number of indicated carriers for the first RAT (e.g., configured number of LTE carriers).

At step 6, the secondary BS 612 may determine a DC configuration for a second connection (to be established) between the UE 610 and secondary BS 612 (e.g., a NR connection), including a configured NR peak data rate that is less than or equal to the adjusted NR peak data rate. For example, the secondary BS 612 may consider the amount of available resources at the BS 612, when determining a configured NR peak data rate for the UE 610.

At step 7a, the secondary BS 612 replies to the master BS 614 with the DC configuration for the second connection to the UE, e.g., including at least the configured peak data rate for the second RAT (configured NR peak data rate for the second connection between UE and secondary BS), e.g., for both UL and DL.

At step 7b, the master BS 614 sends a reconfiguration request message to the UE to cause the UE 610 to establish a MR-DC session including: 1) a multi carrier connection to the master BS (if multiple carriers are configured for LTE or the first RAT); and 2) a second connection to the secondary BS 612 based on the DC configuration for the second RAT (e.g., a NR connection to the secondary BS 612).

At step 8, the UE 610 establishes the second connection to the secondary BS 612 (e.g., a NR connection).

At step 9, the secondary BS 612 may schedule UL and/or DL resources to the UE for the second connection in accordance with the configured peak data rate for the second RAT (e.g., in accordance with the configured NR peak data rate). Thus, for example, UL grants (to allow the UE to transmit to the secondary BS 612), and downlink allocations (indicating resources for downlink transmissions to the UE 610) may be provided so as not to exceed the configured NR peak data rate for the second connection between the secondary BS 612 and the UE 610.

According to yet another example implementation, a signaling flow may be provided as follows:
1) UE establishes a connection with master BS (e.g., LTE)
2) UE sends its UE capabilities via RRC (radio resource control) message to master BS (LTE BS), including:
   a) a LTE UE category that identifies or may correspond to a (stand-alone) LTE peak data rate that is supported by UE, where the UE category (indicates a peak data rate that is supported, and possibly also a maximum number of LTE carriers that are supported by the UE) and also supported band combinations (frequency bands that are supported that may be combined together). A LTE UE category may be indicated for UL and for DL.
   b) UE also indicates its stand-alone NR peak data rate for UL and DL, e.g., for each supported numbers of LTE carriers.
3) BS Determines a DC-Adjusted peak data rates for one or more of the RATS (for LTE and/or NR), for each of UL and DL.
   A) First case: Adjusted peak data rates determined by master BS per table/standard (or a predefined set of rules), e.g., based on the stand-alone peak data rates for LTE and NR per number of carriers configured for LTE for UE. (Also, secondary BS may determine the adjusted peak data rate for the second RAT (e.g., NR).

B) Second case: UE has (explicitly) provided or indicated the DC-adjusted LTE peak data rate for EN-DC and/or the DC-adjusted NR peak data rate for EN-DC. (e.g., provided as part of its capabilities or capability information).

4) Master BS determines one or more adjusted peak data rates for RAT 1 and/or RAT 2 (either through its determination via table or based on this info from UE). Master BS decides to start EN-DC based on capabilities (or based on its determination of adjusted peak data rates), and master BS determines number of configured LTE carriers for UE LTE connection. Master BS determines number of LTE carriers to be used (based on UE capabilities) and decides to use EN-DC mode for UE.

5) Master BS sends a DC establishment request (or DC setup request) to secondary BS, requesting a second connection be established between UE and secondary BS (also provides at least a portion of the UE capabilities—at least stand-alone NR peak data rate, and may also provide the adjusted NR peak data rate (or the secondary BS may determine the adjusted NR peak data rate based on LTE peak and NR peak stand alone). A number of LTE carriers may also be indicated. Secondary BS determines the adjusted NR peak data rate for EN-DC that will be provided to the UE on the NR connection, e.g., based on the UE capabilities and/or the number of configured LTE carriers, for example, or based on other information.

6) Secondary BS determines a NR DC configuration, e.g., including configured NR peak data rate for UL and DL for EN-DC (which may be less than the adjusted peak NR data rate). For example, if DC-adjusted NR peak data rate is 1 Gbps, the secondary BS may determine it can only provide 800 Mbps as the provided or configured NR peak data rate for UL or DL. (Secondary BS may or may not provide information to the master BS indicating this configured NR peak data rate).

7) Master BS sends a reconfiguration message to UE requesting the UE establish a second/NR connection to the secondary BS (this reconfiguration message may include a base station identifier (BS ID), or physical cell ID (PCI) of secondary BS where the UE should connect to for the MR-DC session.

8) UE establishes a connection to the secondary (e.g., NR) BS.

9) Secondary BS (and maybe the main BS) would then provide (or adjust) UL grants and DL allocations to the UE in accordance with the configured peak data rates, which (at least one of these) have been adjusted for EN-DC. This may include, for example, fewer resource allocations for DL, and maybe fewer UL grants to UE, based on a lower configured NR peak data rate, as compared to a stand-alone NR peak data rate for secondary BS. Same may be done for master BS (fewer resource allocations/grants, based on possibly a lower/adjusted LTE peak data rate).

Example 1

Figure 7:
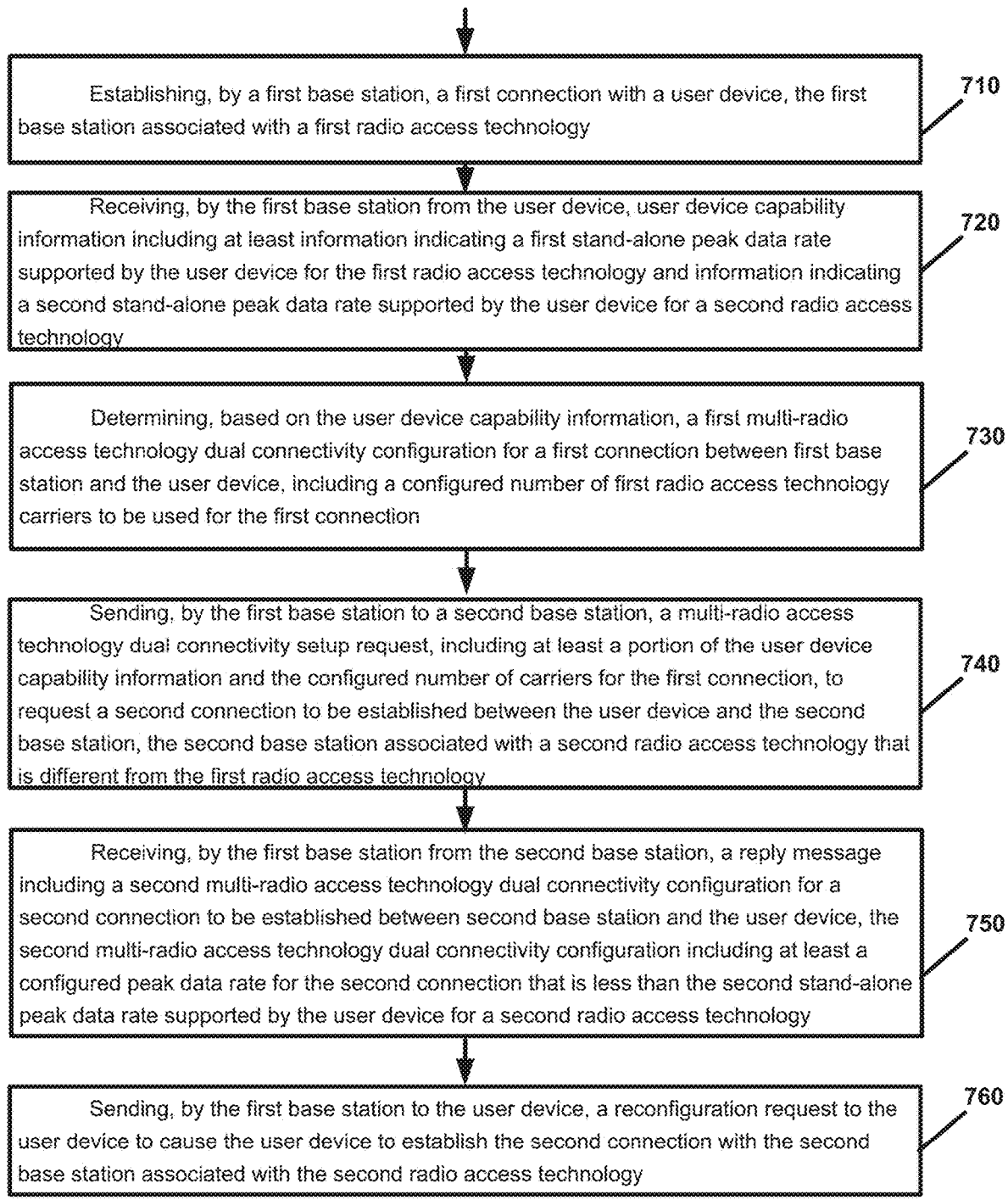
FIG. 7 is a flow chart illustrating operation of a base station according to an example implementation.

FIG. 7 is a flow chart illustrating operation of a base station according to an example implementation. Operation 710 includes establishing, by a first base station, a first connection with a user device, the first base station associated with a first radio access technology. Operation 720 includes receiving, by the first base station from the user device, user device capability information including at least information indicating a first stand-alone peak data rate supported by the user device for the first radio access technology and information indicating a second stand-alone peak data rate supported by the user device for a second radio access technology. Operation 730 includes determining, based on the user device capability information, a first multi-radio access technology dual connectivity configuration for a first connection between first base station and the user device, including a configured number of first radio access technology carriers to be used for the first connection. Operation 740 includes sending, by the first base station to a second base station, a multi-radio access technology dual connectivity setup request, including at least a portion of the user device capability information and the configured number of carriers for the first connection, to request a second connection to be established between the user device and the second base station, the second base station associated with a second radio access technology that is different from the first radio access technology. Operation 750 includes receiving, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than the second stand-alone peak data rate supported by the user device for a second radio access technology. Operation 760 includes sending, by the first base station to the user device, a reconfiguration request to the user device to cause the user device to establish the second connection with the second base station associated with the second radio access technology.

Example 2

According to an example implementation of example 1, and further comprising scheduling, by the first base station, resources for the user device for the first connection in accordance with the first multi-radio access technology dual connectivity configuration for the first connection.

Example 3

According to an example implementation of any of examples 1-2, wherein the determining a first multi-radio access technology dual connectivity configuration comprises: determining a dual connectivity adjusted peak data rate for the first connection and associated with the first radio access technology, which is less than or equal to the first stand-alone peak data rate supported by the user device for the first radio access technology; determining, based on the user device capability information, a first multi-radio access technology dual connectivity configuration for the first connection between first base station and the user device, including a configured number of first radio access technology carriers to be used for the first connection and a configured peak data rate for the first connection that is less than or equal to the dual connectivity adjusted peak data rate for the first connection.

Example 4

According to an example implementation of any of examples 1-3, wherein the user device capability information includes a user device category that indicates at least the first stand-alone peak data rate supported by the user device for the first radio access technology.

Example 5

According to an example implementation of any of examples 1-4, wherein the first radio access technology comprises Long Term Evolution (LTE) and the second radio access technology comprises New Radio (NR/5G).

Example 6

Figure 8:
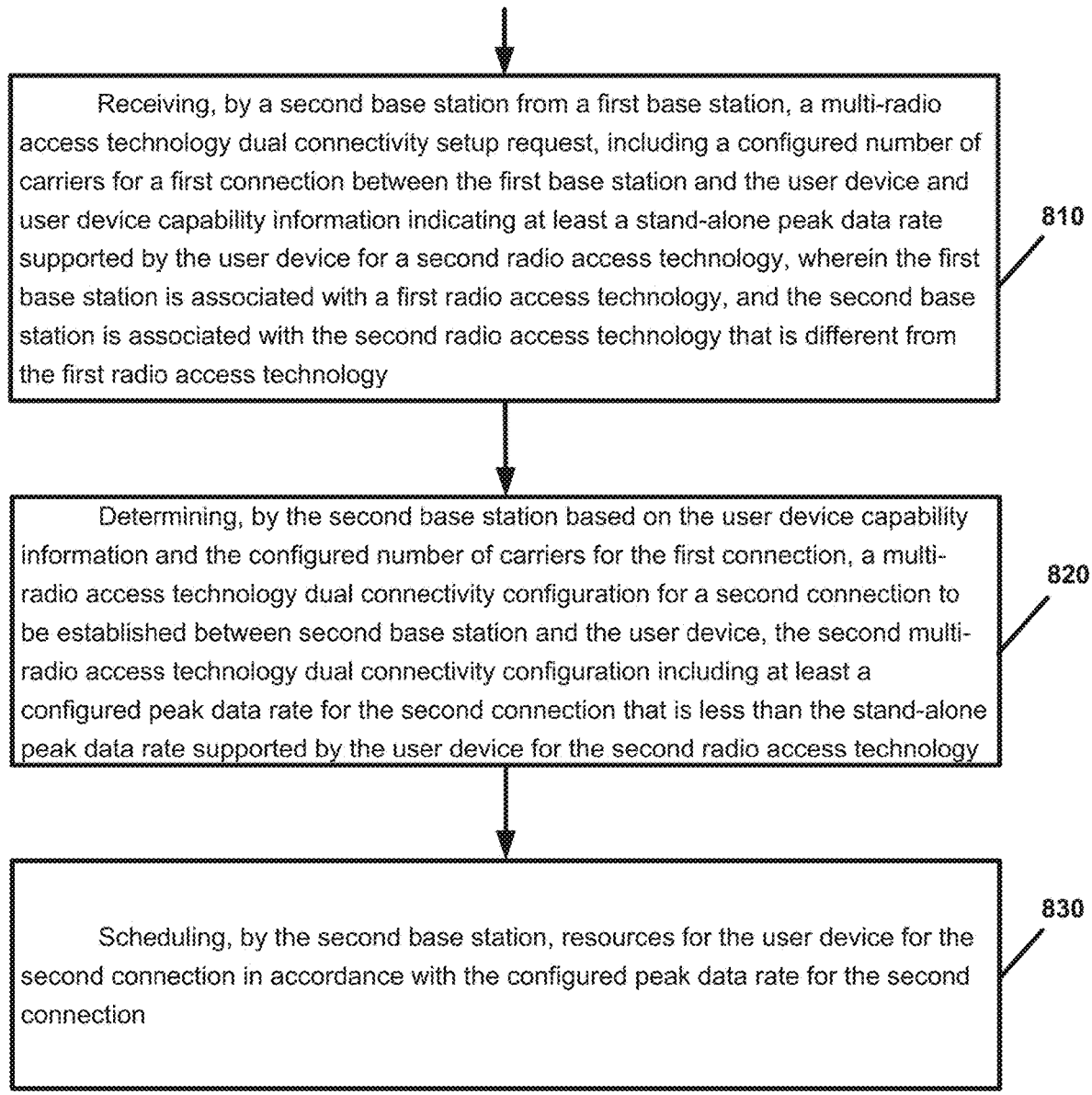
FIG. 8 is a flow chart illustrating operation of a base station according to an example implementation.

FIG. 8 is a flow chart illustrating operation of a base station according to another example implementation. Operation 810 includes receiving, by a second base station from a first base station, a multi-radio access technology dual connectivity setup request, including a configured number of carriers for a first connection between the first base station and the user device and user device capability information indicating at least a stand-alone peak data rate supported by the user device for a second radio access technology, wherein the first base station is associated with a first radio access technology, and the second base station is associated with the second radio access technology that is different from the first radio access technology. Operation 820 includes determining, by the second base station based on the user device capability information and the configured number of carriers for the first connection, a multi-radio access technology dual connectivity configuration for a second connection to be established between second base station and the user device, the second multi-radio access technology dual connectivity configuration including at least a configured peak data rate for the second connection that is less than the stand-alone peak data rate supported by the user device for the second radio access technology. And, operation 830 includes scheduling, by the second base station, resources for the user device for the second connection in accordance with the configured peak data rate for the second connection.

Example 7

According to an example implementation of example 6, wherein the scheduling comprises: sending, by the second base station to the first base station, a reply message including the multi-radio access technology dual connectivity configuration for the second connection to be established between the second base station and the user device; establishing the second connection between the user device and the second base station as part of a multi-radio access technology dual connectivity session with the user device; and scheduling, by the second base station, resources for the user device for the second connection in accordance with the configured peak data rate for the second connection.

Example 8

According to an example implementation of any of examples 6-7, wherein the determining a multi-radio access technology dual connectivity configuration for a second connection comprises: determining a dual connectivity adjusted peak data rate for the second connection and associated with second radio access technology, the dual connectivity adjusted peak data rate for the second connection being less than the stand-alone peak data rate supported by the user device for the second radio access technology; and, determining, based on the user device capability information, a multi-radio access technology dual connectivity configuration for the second connection between second base station and the user device, including a configured peak data rate for the second connection that is less than or equal to the dual connectivity adjusted peak data rate for the second connection.

Example 9

Figure 9:
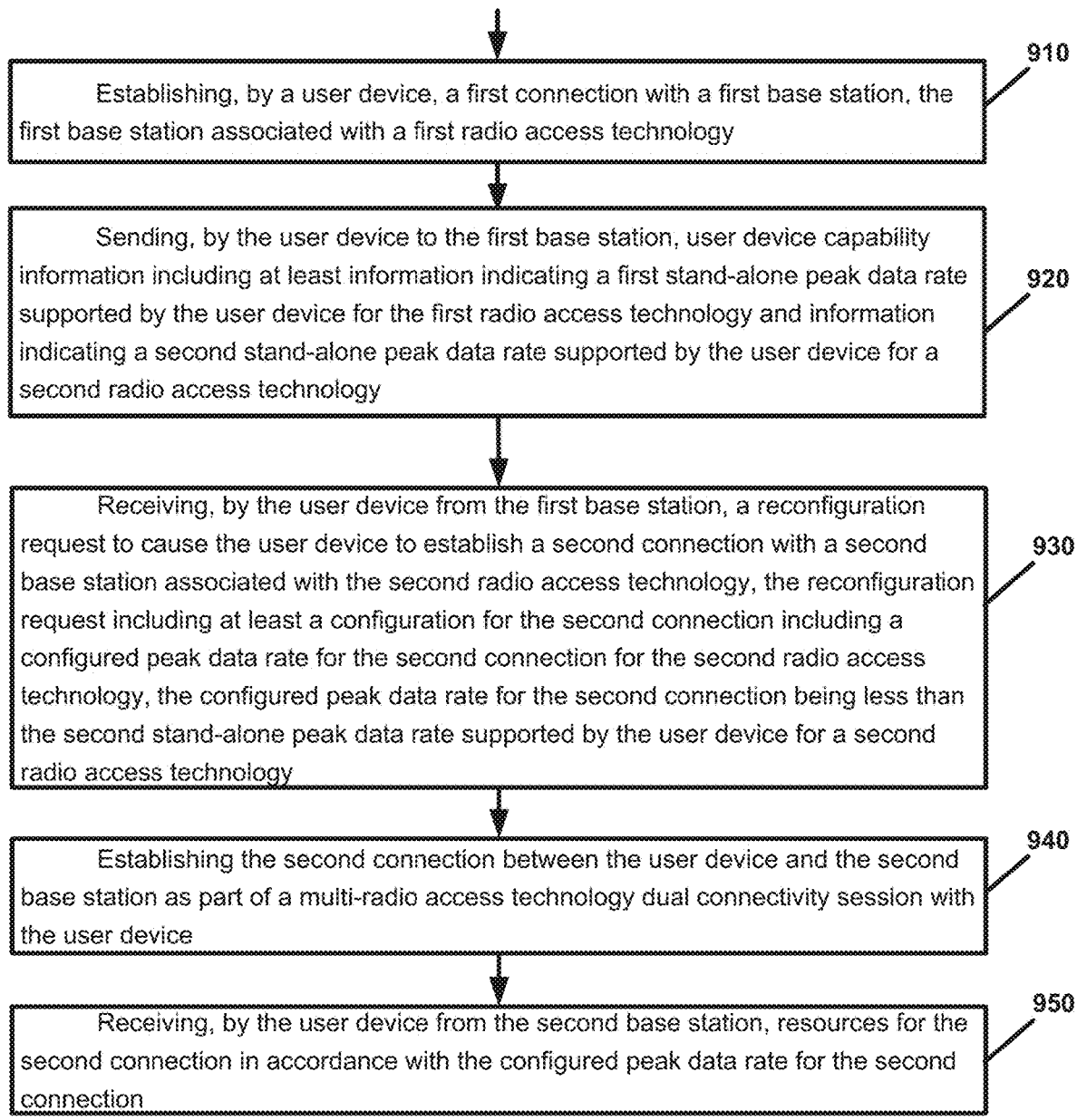
FIG. 9 is a flow chart illustrating operation of a user device (UE) according to an example implementation.

FIG. 9 is a flow chart illustrating operation of a user device according to an example implementation. Operation 910 includes establishing, by a user device, a first connection with a first base station, the first base station associated with a first radio access technology. Operation 920 includes sending, by the user device to the first base station, user device capability information including at least information indicating a first stand-alone peak data rate supported by the user device for the first radio access technology and information indicating a second stand-alone peak data rate supported by the user device for a second radio access technology. Operation 930 includes receiving, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than the second stand-alone peak data rate supported by the user device for the second radio access technology. Operation 940 includes establishing the second connection between the user device and the second base station as part of a multi-radio access technology dual connectivity session with the user device. Operation 950 includes receiving, by the user device from the second base station, resources for the second connection in accordance with the configured peak data rate for the second connection.

Example 10

According to an example implementation of example 9, wherein the reconfiguration request further includes at least a configuration for the first connection including a configured peak data rate for the first connection and a number of carriers to be used for the first connection.

Example 11

According to an example implementation of any of examples 9-10, wherein the user device capability information includes a user device category that indicates at least the first stand-alone peak data rate supported by the user device for the first radio access technology.

Example 12

Figure 10:
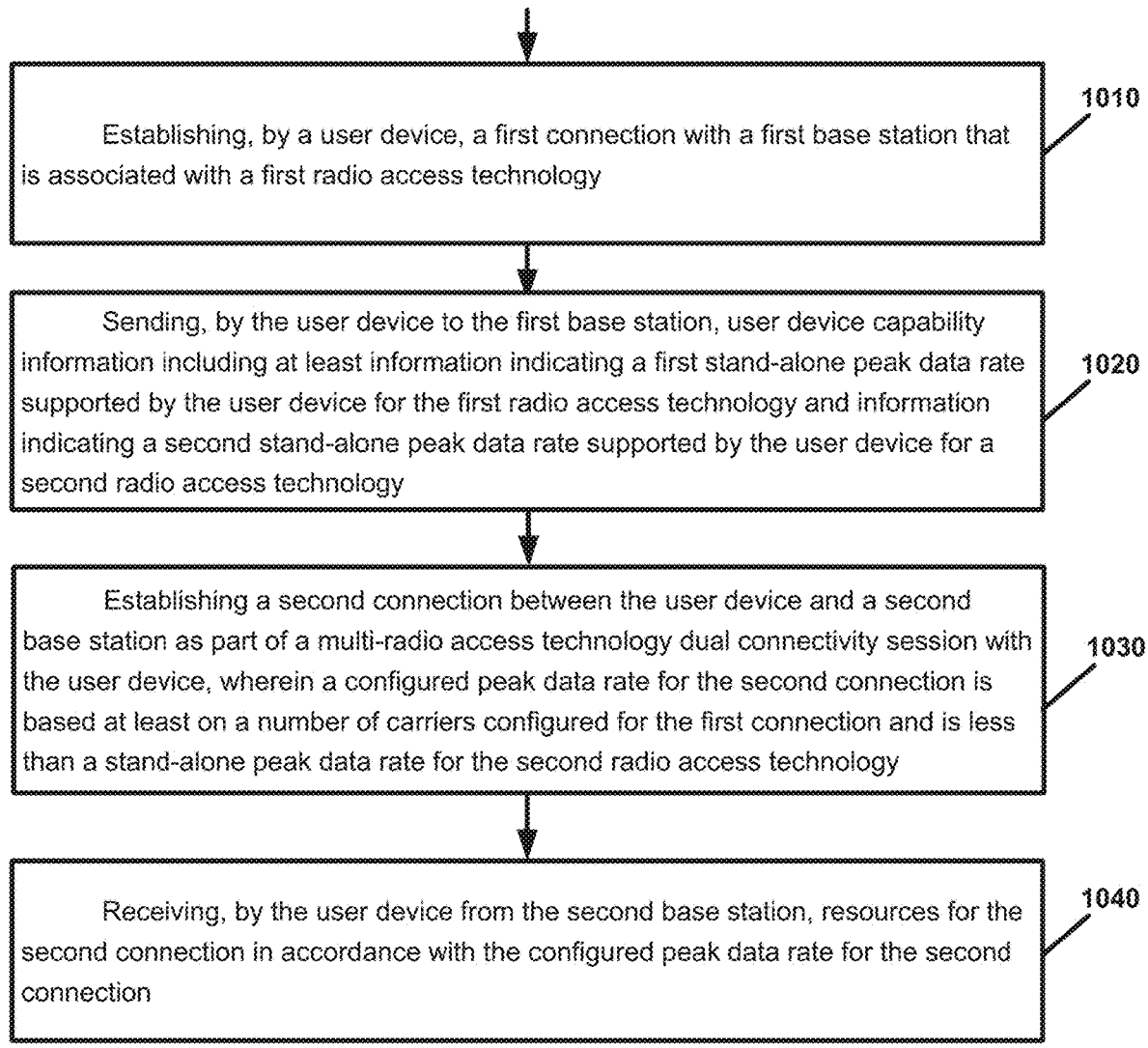
FIG. 10 is a flow chart illustrating operation of a user device (UE) according to another example implementation.

FIG. 10 is a flow chart illustrating operation of a user device according to another example implementation. Operation 1010 includes establishing, by a user device, a first connection with a first base station that is associated with a first radio access technology. Operation 1020 includes sending, by the user device to the first base station, user device capability information including at least information indicating a first stand-alone peak data rate supported by the user device for the first radio access technology and information indicating a second stand-alone peak data rate supported by the user device for a second radio access technology. Operation 1030 includes establishing a second connection between the user device and a second base station as part of a multi-radio access technology dual connectivity session with the user device, wherein a configured peak data rate for the second connection is based at least on a number of carriers configured for the first connection and is less than a stand-alone peak data rate for the second radio access technology. And, operation 1040 includes receiving, by the user device from the second base station, resources for the second connection in accordance with the configured peak data rate for the second connection.

Example 13

According to an example implementation of any of examples 1-12, wherein the first radio access technology comprises Long Term Evolution (LTE) and the second radio access technology comprises New Radio (NR/5G).

Example 14

An apparatus comprising means for performing a method of any of examples 1-13.

Example 15

An apparatus comprising at least one processor and at least one memory including computer instructions that, when executed by the at least one processor, cause the apparatus to perform a method of any of examples 1-13.

Example 16

An apparatus comprising a computer program product including a non-transitory computer-readable storage medium and storing executable code that, when executed by at least one data processing apparatus, is configured to cause the at least one data processing apparatus to perform a method of any of examples 1-13.

Figure 11:
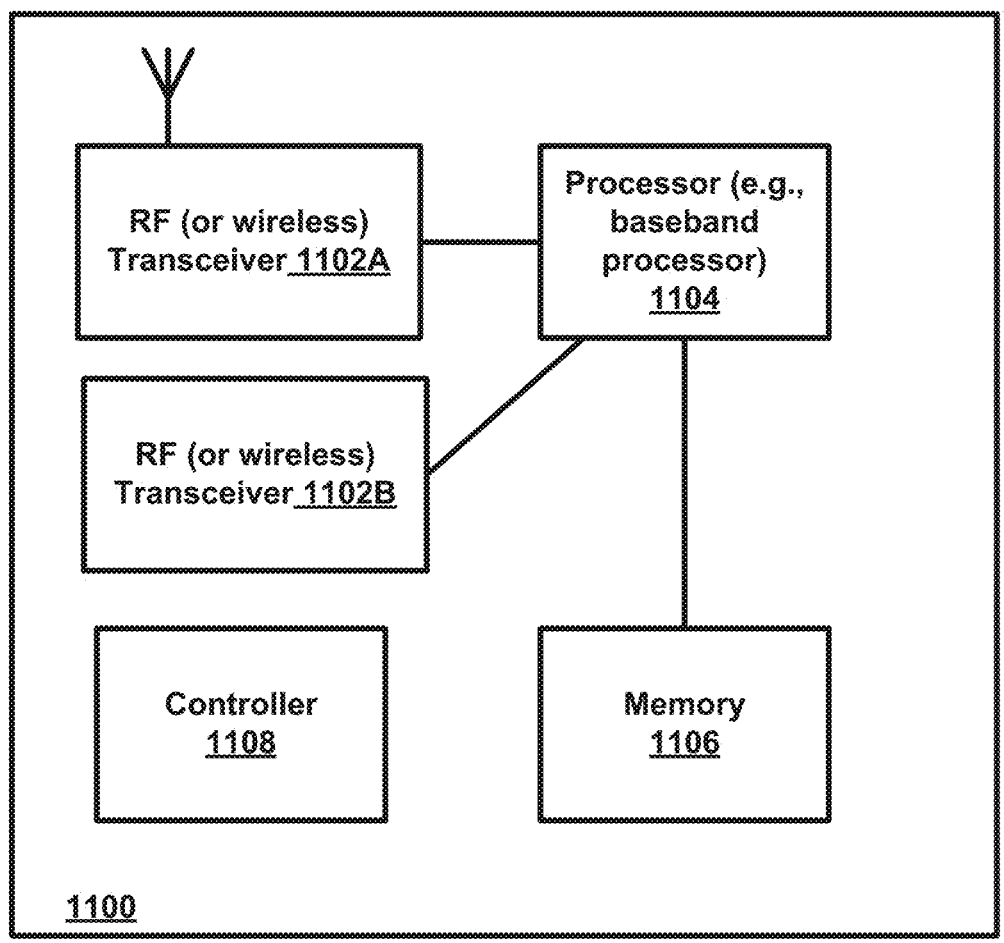
FIG. 11 is a block diagram of a node or wireless station (e.g., base station/access point or mobile station/user device) according to an example implementation.

FIG. 11 is a block diagram of a wireless station (e.g., AP, BS, relay node, eNB, UE or user device) 1100 according to an example implementation. The wireless station 1100 may include, for example, one or two RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11 a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example implementation, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed:
1. A method, comprising:
establishing, by a first base station, a first connection with a user device, the first base station associated with a first radio access technology;
receiving, by the first base station from the user device, user device capability information, the user device capability information comprises a single-carrier peak data rate supported by the user device for the first radio access technology and a single-carrier peak data rate supported by the user device for a second radio access technology, the user device capability information further comprises a multi-carrier peak data rate supported by the user device for the first radio access technology and a multi-carrier peak data rate supported by the user device for the second radio access technology; and
determining, based on the user device capability information, a first multi-radio access technology dual connectivity configuration for the first connection between first base station and the user device.
2. The method of claim 1, further comprising:
scheduling, by the first base station, resources for the user device for the first connection in accordance with the first multi-radio access technology dual connectivity configuration for the first connection.
3. The method of claim 1, wherein the determining a first multi-radio access technology dual connectivity configuration comprises:
determining a dual connectivity adjusted peak data rate for the first connection and associated with the first radio access technology, which is less than or equal to a first stand-alone peak data rate supported by the user device for the first radio access technology.

4. The method of claim 1, wherein the user device capability information includes a user device category that indicates at least a first stand-alone peak data rate supported by the user device for the first radio access technology.

5. The method of claim 1, wherein the first radio access technology comprises Long Term Evolution (LTE) and the second radio access technology comprises New Radio (NR/5G).

6. The method of claim 1, further comprising:
sending, by the first base station to a second base station, a multi-radio access technology dual connectivity setup request, including at least a portion of the user device capability information and a configured number of carriers for the first connection, to request a second connection to be established between the user device and the second base station, the second base station associated with a second radio access technology that is different from the first radio access technology;
receiving, by the first base station from the second base station, a reply message including a second multi-radio access technology dual connectivity configuration for a second connection to be established between second base station and the user device, the second multi-radio access technology dual connectivity configuration including at least a configured peak data rate for the second connection that is less than a second stand-alone peak data rate supported by the user device for a second radio access technology;
sending, by the first base station to the user device, a reconfiguration request to the user device to cause the user device to establish the second connection with the second base station associated with the second radio access technology.

7. A method comprising:
establishing, by a user device, a first connection with a first base station, the first base station associated with a first radio access technology; and
sending, by the user device to the first base station, user device capability information, the user device capability information comprises a single-carrier peak data rate supported by the user device for the first radio access technology and a single-carrier peak data rate supported by the user device for a second radio access technology, the user device capability information further comprises a multi-carrier peak data rate supported by the user device for the first radio access technology and a multi-carrier peak data rate supported by the user device for the second radio access technology.

8. The method of claim 7, further comprises:
receiving, by the user device from the first base station, a reconfiguration request to cause the user device to establish a second connection with a second base station associated with the second radio access technology, the reconfiguration request including at least a configuration for the second connection including a configured peak data rate for the second connection for the second radio access technology, the configured peak data rate for the second connection being less than a second stand-alone peak data rate supported by the user device for the second radio access technology;
establishing the second connection between the user device and the second base station as part of a multi-radio access technology dual connectivity session with the user device; and
receiving, by the user device from the second base station, resources for the second connection in accordance with the configured peak data rate for the second connection.

9. The method of claim 7, wherein the user device capability information includes a user device category that indicates at least a first stand-alone peak data rate supported by the user device for the first radio access technology.

10. The method of claim 7, wherein the first radio access technology comprises Long Term Evolution (LTE) and the second radio access technology comprises New Radio (NR/5G).

11. An apparatus comprising:
at least one processor; and
at least one memory including computer program code, the at least one memory and the computer program code configured to, with the at least one processor, cause the apparatus to perform at least:
establish a first connection with a first base station, the first base station associated with a first radio access technology; and
send, to the first base station, user device capability information, the user device capability information comprises a single-carrier peak data rate supported by the user device for the first radio access technology and a single-carrier peak data rate supported by the user device for a second radio access technology, the user device capability information further comprises a multi-carrier peak data rate supported by the user device for the first radio access technology and a multi-carrier peak data rate supported by the user device for the second radio access technology.

12. The apparatus of claim 11, wherein the apparatus is further caused to:
receive, from the first base station, a reconfiguration request to cause the apparatus to establish a second connection with a second base station associated with the second radio access technology, the reconfiguration request including at least a configuration for the second connection including a configured peak data rate for the second connection for the second radio access technology, the configured peak data rate for the second connection being less than a second stand-alone peak data rate supported by the apparatus for the second radio access technology;
establish the second connection between the apparatus and the second base station as part of a multi-radio access technology dual connectivity session with the apparatus; and
receive, from the second base station, resources for the second connection in accordance with the configured peak data rate for the second connection.

13. The apparatus of claim 11, wherein the user device capability information includes a user device category that indicates at least a first stand-alone peak data rate supported by the apparatus for the first radio access technology.

14. The apparatus of claim 11, wherein the first radio access technology comprises Long Term Evolution (LTE) and the second radio access technology comprises New Radio (NR/5G).

* * * * *